F. W. COTTERMAN.
GEARING.
APPLICATION FILED MAY 11, 1910.
1,232,004.
Patented July 3, 1917.
2 SHEETS—SHEET 2.
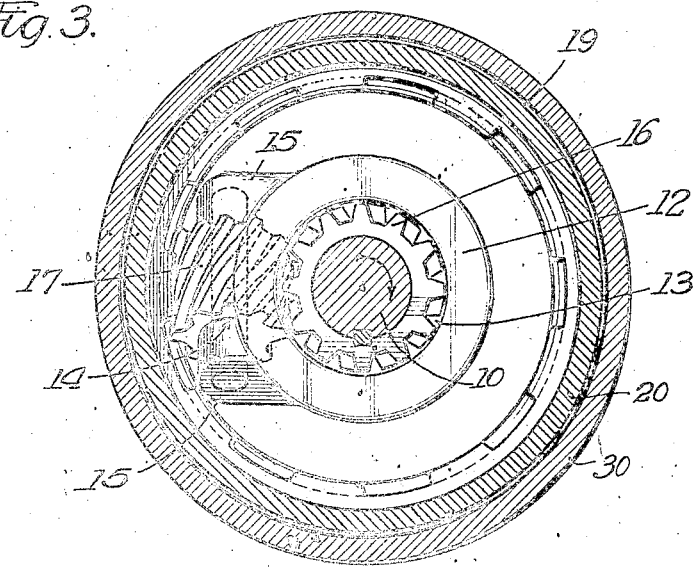
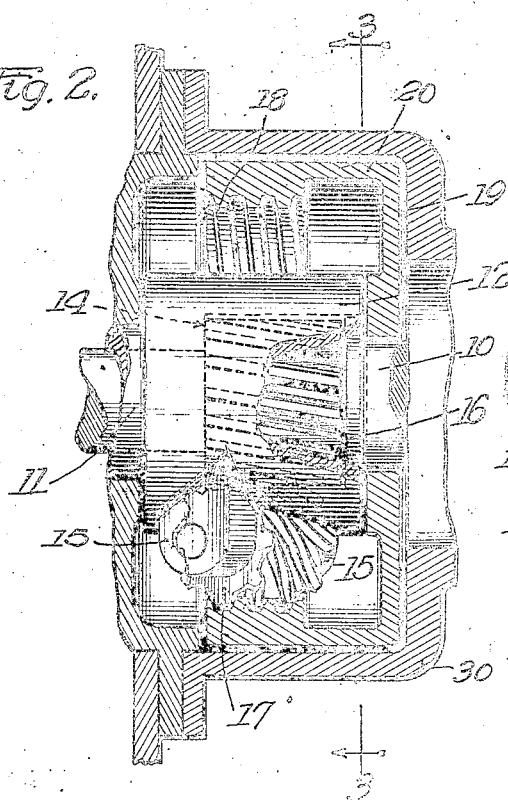
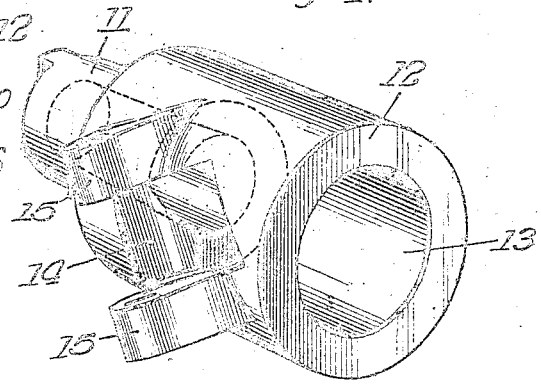
Witnesses:
Inventor:
Frederich W. Cotterman

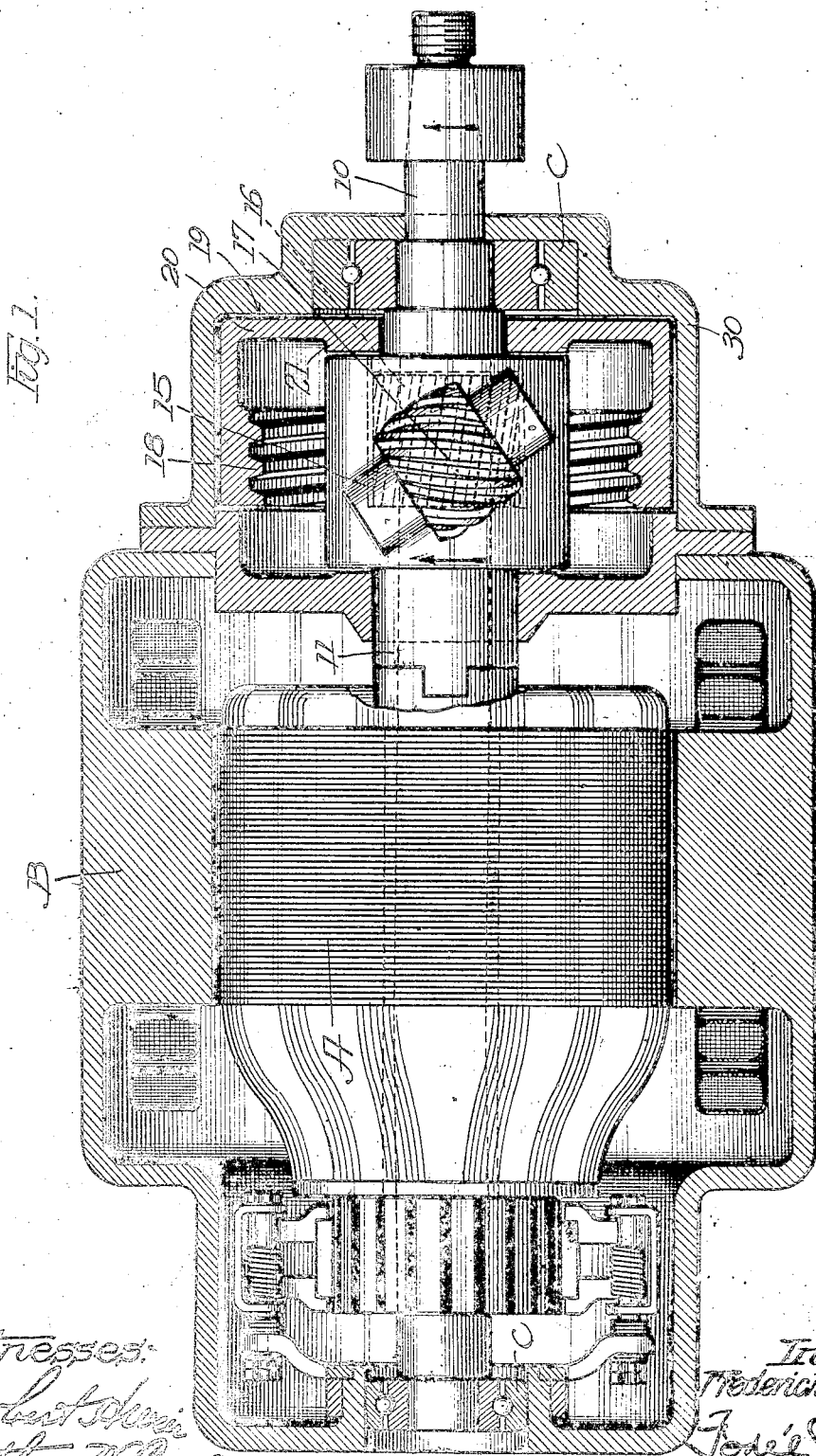

UNITED STATES PATENT OFFICE.

FREDERICK W. COTTERMAN, OF NEWARK, NEW JERSEY, ASSIGNOR OF ONE-HALF TO VINCENT G. APPLE, OF DAYTON, OHIO.

GEARING.

1,232,004.  Specification of Letters Patent.  Patented July 3, 1917.

Application filed May 11, 1916. Serial No. 96,769.

*To all whom it may concern:*

Be it known that I, FREDERICK W. COTTERMAN, a citizen of the United States, residing at Newark, in the county of Essex and State of New Jersey, have invented certain new and useful Improvements in Gearing, of which the following is a specification.

My invention relates to improvements in change speed gearing, and more particularly, in some of its aspects, to gearing for interposition between two rotating parts, either of which may be the driver, and whereof the first, when operating as the driver, rotates the second at relatively low speed, whereas the second, when operating as the driver, rotates the first at equal speed.

Gearing of this description has many uses, one of which is in the operation of a dynamo-electric machine as a motor for starting a gas engine or as a generator driven by the gas engine. Acting as a motor the dynamo may best operate through a reduction gear to drive the engine shaft at slow speed with high torque; operating as an engine driven generator the armature of the dynamo may sufficiently be rotated at engine speed.

In the accompanying drawings I have shown my invention as embodied in such an equipment for engine starting purposes, but it will be understood that, while the particular development herein shown is designed in detail for this particular employment and some of the details of its construction may be claimed for their advantage in such an embodiment, my invention in its broader aspects is a speed change gear applicable to any two rotating members where the speed ratio between the members is to change according as one or the other is the driver.

Among the objects of my invention are to provide a mechanism of very simple construction, involving a minimum number of parts, each simple, rugged, durable, and easily manufactured, and all related for automatic operation.

Other and further objects of my invention will become apparent to those skilled in the art from the following description taken in conjunction with the accompanying drawings, wherein—

Figure 1 is a longitudinal vertical sectional view with parts in elevation, through a structure embodying my invention in association with a dynamo electric machine.

Fig. 2 is a fragmentary view similar to Fig. 1, illustrating the gearing in a different position with parts broken away.

Fig. 3 is a vertical sectional view on the line 3—3 of Fig. 2.

Fig. 4 is a perspective view of the pinion carrier.

In the drawings 10 is a shaft representing one rotatable member. 11 is the sleeve thereon representing another rotatable member. To either power may be applied; from either power may be delivered. Sleeve 11 has fast thereon a carrier 12, preferably a cup having an axial cavity 13 into which opens a side aperture 14 flanked by suitably disposed bearing ears 15. Within the cavity 13 of the carrier the shaft 10 bears a gear 16, (called herein the "shaft" gear) with which meshes a gear 17 (called herein the "connecting" gear) that is mounted on an arbor carried in the ears 15. Gear 17 also meshes with an "internal" gear 18 that surrounds the cylindrical carrier. When sleeve 11 acts as the driver, the gearing communicates rotation to the shaft 10 at the rate of one turn of shaft 10 to four turns of sleeve 11. When shaft 10 acts as the driver, sleeve 11 is rotated one-to-one with the shaft. To explain:—

The plane of the axis of connecting gear 17 (vertical to the sheet in Fig. 1) is intersected at an oblique angle by the axis of the shaft 10, the angle being preferably about 45 degrees although different angles may be used and compensated for by appropriate spiraling of the gear teeth. The coacting teeth of the gear shaft 16 and diagonally-disposed connecting gear 17 are preferably so cut, spirally, that the inward teeth of connecting gear 17 mesh with shaft-gear 16 nearly axially of shaft 10, and the outward teeth of said connecting gear mesh with internal gear 18 nearly transversely to the axis of shaft 10. The internal gear 18 is capable of limited axial displacement and preferably takes the form of an annulus having its axis parallel with the axis of shaft 10. At the right or outer end of its limit of axial displacement this gear engages and is stopped by a pressure-resisting abutment 19, that is preferably a fixed wall of the casing structure or the frame of the apparatus. At the left or inner end of its limited axial movement such internal gear engages and is stopped by a part rotatable with the sleeve 12. As a simple mechanical construction to the desired effect, this gear 18 is cut on the cylinder wall of a cup 20, the head-wall or hub portion 21 of which may, at its inner limit of throw, coact directly as a friction clutch with the end of sleeve 12, and said head wall of which may, at its outer limit of throw, contact with the fixed wall 19 forming part of the dynamo-gear-housing.

The numbers of teeth on the several gears 16, 17 and 18 will determine the reduction gear ratio, and for a four-to-one speed reduction in driving shaft 10 from sleeve 11, I will assume that shaft-gear 16 has twelve teeth, connecting gear 17 has eight teeth, and internal gear 18 has nine teeth.

In the reduction gear operation of the device the sleeve 11 acts as the driving element. As it turns front-toward-top, Fig. 1, its carrier 12 carries bodily with it the connecting gear 17. This bodily movement of the connecting gear 17 about the axis of shaft 10 I will, as a matter of arbitrary distinction in wording, for purposes of clearness, call its "revolution." Rotary motion of the connecting gear 17 about its own diagonal axis I will term distinctively, its "rotation." As the connecting gear 17 is "revolved" (bodily) about the shaft gear 16, (assumed to be stationary) its eight teeth, meshing with the twelve teeth of shaft gear 16, tend to produce a "rotation" of the connecting gear 17 (about its own axis, front-toward-right) one and one-half times in the course of its single "revolution." In other words, were internal gear 18 removed from the device connecting gear 17 would "rotate" one and one-half turns in "revolving" once about the assumedly-stationary shaft-gear 16. But considering the "revolution" of the connecting gear 17 within the internal gear 18, (assuming the latter to be stationary) it will be seen that one "revolution" must bring the eight teeth of the connecting gear 17 into coöperation with the nine teeth of the internal gear 18, so that, if the shaft gear 16 were removed, and internal gear 18 held against displacement, connecting gear 17 would "rotate," front-toward-right, one and one-eighth times per "revolution."

Now it will be apparent that with the intermediate gear 17 engaging both the shaft gear 16 and the internal gear 18, as shown in the drawing, one "revolution" of the carrier cup and its connecting gear 17 tends to produce a "rotation" of gear 17 on its own axis to the extent of twelve teeth from the coaction of said gear 17 with shaft gear 16 and to produce a slower "rotation" of said gear 17, to the extent of only nine teeth from the coaction of said gear 17 with the internal gear 18. Consequently this differentiation, or tendency of the two gears 16 and 18 to "rotate" gear 17 at different speeds, must be taken up by displacement of either internal gear 18 or shaft gear 16 or both. Assuming shaft 10 to be initially at rest and under load, but not fixed against rotation, each sleeve-impelled "revolution" of gear 17, causing it to receive from the shaft gear 16 a tendency to "rotate" front-to-right about its own axis to an extent of three teeth more than the internal gear 18 tends to permit it to "rotate," makes the gear 17 act as a lever fulcruming the gear 16 and acting on gear 18, and results in the application of an axial thrust upon gear 18 that shifts it axially to the right (Fig. 1), until, almost immediately, its very limited axial displacement is prevented by its contact of wall 20 with the stop 19. The internal gear 18, so forced axially against stop 19, can now neither revolve with the revolving gear 17, nor move farther axially, and, therefore, the compensation for the stated gear differentiation must hereafter take place by rotation of the shaft gear 16. The now-fixed external gear 18 now positively limits the "rotation" of connecting gear 17 to one and one-eighth "rotations" per "revolution." Therefore, since connecting gear 17 can "rotate" only nine teeth in the course of a "revolution," and its gear-engagement with the shaft-gear 16 requires that twelve of its teeth shall coöperate with the shaft gear 16 in the course of its "revolution" if shaft gear 16 is to remain stationary, it follows that said shaft gear 16 must be "cammed" forwardly, or front-toward-top to the extent of three teeth or one-quarter of a turn, during the course of the full revolution of the carriage for connecting gear 17.

Thus, it will be apparent that, with sleeve 11 acting as the driver, shaft 10 must be driven in one-to-four ratio to, and in the same direction of rotation as, the driving sleeve 11. The armature A of a suitable dynamo is, in the specific construction shown, connected with sleeve 11, and said dynamo, acting as a motor, will drive the engine shaft 10 through the reducing gear arrangement described. When, however, the engine "picks up" and begins to drive shaft 10 at full speed, the sleeve 11 may be considered as the element to be driven, with armature A as its load, and the drive will occur at a one-to-one ratio, with the gearing mechanism acting simply as a clutch. This operation is as follows:

When shaft 10 acts as a driving member, rotating front-toward-top, Fig. 1, (in the same direction that it was started by the motor A) the gear 16, rotating with the shaft, tends to drive the gear 17 in a front-toward-left direction of rotation; the sleeve 11 and carrier 12 for said gear 17 tending, of course, to be held against revolutions by the load typified by armature A. Consequently the gear 17 tends in its front-toward-left rotation to shift internal gear 18 axially toward the left, Fig. 1. This axial shift of the gear 18 brings its hub 21 into frictional engagement with the end of the carrier 12, and this engagement locks the gear 17 against further rotation about its own axis, but, of course, leaves internal gear 18 free to rotate with the sleeve 12. Consequently the gear 17 being unable to rotate on its own axis, operates simply as a clutch member between gear 16 and 18, so that they rotate in unison, and of course since connecting gear 17 is mounted on the rotatable carrier 12 it carries said carrier 12 and sleeve 11 in direct one-to-one rotation with the shaft 10. Of course this clutch connection continues only so long as the shaft 10 continues to drive in the same direction of rotation. If, in coming to a stop, the shaft 10 rocks backward slightly, (as for instance when a gas engine shaft stops in position creating a high compression in one or more cylinders and then rocks back slightly to a lower compression position) the "rock back" of the shaft 10 will start turning shaft gear 16 front-toward-bottom. Since the carrier 12 under such conditions is no longer rotated front-toward-top, the teeth of pinion 17 are not moving under load in a front-toward-right direction and consequently no longer holds internal gear 18 against backward rotation. As a result the carrier 12 is free to move top-toward-bottom, or in a reverse direction, with the gear 16. This capacity for accommodating a material "rock back" is a valuable refinement of the invention as applied to engine-starters, although it is not essential to the broader aspect of my invention.

As a matter of preferred structure in such a special embodiment as herein shown, I provide a cup shaped gear housing 30 overlying an end of the dynamo field frame B, and within which the reduction gearing above described is completely inclosed. Armature A is suitably supported on bearings C—C. It will be obvious that a plurality of planetary connecting gears may be used instead of the single gear 17 illustrated, the number depending on the power to be transmitted and conditions of service.

Whereas I have illustrated and described a single embodiment of my invention it will be obvious that changes may be made therein without departing from the spirit thereof and the scope of the appended claims.

Having described my invention, what I claim is:—

1. In combination, substantially concentric non-meshing gears with teeth disposed relatively crosswise, the teeth of one gear generally axial and on the other gear generally transverse to the axis, an interposed diagonally disposed connecting gear meshing with both said gears, means for revolving said connecting gear bodily, and means for opposing connecting-gear-impelled displacement of one of the concentric gears, thereby to cause said connecting gear in its revolution to displace the other gear.

2. In combination, substantially concentric non-meshing gears, with teeth disposed relatively crosswise, an interposed diagonally disposed connecting gear meshing with both of said gears, means for revolving said connecting gear bodily, and means for opposing connecting-gear-impelled displacement of one of the concentric gears, thereby to cause said connecting gear in its revolution to rotatively displace the other gear.

3. In combination, two rotatable elements, and a speed varying gearing therebetween, comprising a spiral connecting gear diagonally disposed on and carried in revolution by one element, a spur like gear on the other element, and an internal spiral gear, relatively fixed in operation; said gears intermeshing and having tooth differentiation whereby the on-its-own-axis rotation of the connecting gear incident to its bodily revolution with one element is at a rate different from that which the gear on the other element tends freely to permit.

4. In combination, concentric gears, an interposed rotatable connecting gear bodily revoluble therebetween, and meshing with both thereof, a drive element carrying said connecting gear in revolution, a rotatable element connected with one concentric gear, means for resisting displacement of the other gear, said concentric gears both having teeth tending to rotate the connecting gear in the same direction about its own axis, but at different rates as it is bodily revolved.

5. In combination, substantially concentric non-meshing gears with teeth disposed relatively crosswise, the teeth of one gear generally axial and on the other generally transverse to the axis, an interposed diagonally disposed connecting gear meshing with both said gears, means for revolving said connecting gear bodily, means for opposing connecting-gear-impelled displacement of one of the concentric gears, thereby to cause said connecting gear in its revolution to displace the other gear, and means for clutching together the last mentioned gear and the interposed diagonally disposed connecting gear on the reversal of power.

6. In combination, substantially concentric non-meshing gears, comprising a gear having its teeth generally axial and an internal gear having its teeth transverse to the axis, an interposed diagonally disposed connecting gear meshing with both said gears, means for revolving said connecting gear bodily, and means for opposing connecting-gear-impelled displacement of the internal gear, thereby to cause said connecting gear in its revolution to rotatively displace the other gear.

7. In combination, substantially concentric non-meshing gears with teeth disposed relatively crosswise, the teeth of one gear generally axial and on the other gear generally transverse to the axis, an interposed diagonally disposed connecting gear meshing with both of said gears, means for revolving said connecting gear bodily, and a stationary abutment for opposing connecting-gear-impelled displacement of the gear having teeth disposed generally transverse to the axis, thereby to cause said connecting gear in its revolution to rotatively displace the other gear.

8. In combination, substantially concentric non-meshing gears with teeth disposed relatively crosswise, the teeth of one gear generally axial and on the other gear generally transverse to the axis, an interposed diagonally disposed connecting gear meshing with both said gears, means for revolving said connecting gear bodily about the axis of the other gears, and means for opposing the connecting-gear-impelled displacement of one of the concentric gears, thereby to cause said connecting gear in its revolution to rotatively displace the other gear.

9. In combination, a pair of concentric shafts, a gear carried by one shaft, a hub carried by the other shaft, and counter-bored to overlie the said gear, an internal gear rotatably mounted independently of the said shaft and positioned to lie in the same plane as the aforesaid gear, said hub having a recess formed in its periphery, a diagonally disposed connecting gear meshing with both of the aforesaid gears and rotatably mounted on the hub, the teeth of the aforesaid gear being generally axial and the teeth of the internal gear generally transverse to the axis, and means for opposing connecting-gear-impelled displacement of one of the concentric gears, thereby to cause said connecting gear in its revolution to rotatively displace the other gear.

10. In combination a geared pinion; a concentric internal gear spaced apart therefrom; an intermediate gear meshing with both gears whereby to move the internal gear axially when bodily rotated, the pinion being fixed and to rotate the pinion when the internal gear is fixed; means to bodily revolve said intermediate gear within said inter-gear space and means to stop the axial movement of said internal gear to rotate the pinion.

11. In a power transmitting device, two shafts, two gears, one connected with each shaft, one gear revoluble about the other, a stop, a structure shiftable automatically by said gears and having constant gear connection with the revoluble gear, said structure in one of its positions coacting with the stop to compel rotation of the revoluble gear as it revolves, and in its other position coacting with the revoluble gear to prevent rotation of the revoluble gear as it revolves whereby to change the speed ratio of the said shafts.

12. In a power transmitting device, two shafts, two gears, one connected to each shaft, one gear revoluble about the other, means shiftable to two positions and in one position connecting said revoluble gear with the opposing shaft for rotation of said shafts at one speed ratio, and means coacting with the said shiftable means in the other position to prevent free rotation thereof.

13. In a power transmitting device, two shafts, a gear carried by each said shaft, one gear revoluble about the other, a stop, a member automatically shiftable by the operation of said gears in one position to coact with said stop and thereby to compel rotation of said revoluble gear incidental to its revolution to connect the shafts one to drive the other at one speed ratio, and in the other position connecting the revoluble gear with the other shaft thereby to connect said shafts one to drive the other at another speed ratio.

14. In a power transmission device, two shafts, two gears, one connected with each shaft, one gear revoluble about the other, and means, revoluble-gear-impelled in one direction to compel rotation of said revoluble gear incidental to its revolutions to connect the shafts one to drive the other at one speed ratio, and in another direction connecting the revoluble gear with the other shaft whereby to connect said shafts one to drive the other at another speed ratio.

15. In a power transmission device, two shafts, a gear connected with one said shaft, a second gear, an interposed bodily revoluble rotatable connecting-gear connected with the other shaft, means, revoluble-gear-impelled to move the second gear in one direction to stop rotation thereof, and in the other direction to connect the second mentioned gear with the connecting-gear to prevent relative rotation thereof.

In testimony whereof I hereunto set my hand in the presence of two subscribing witnesses.

FREDERICK W. COTTERMAN.

In the presence of—
 ELLA J. ZBORAY,
 ISRAEL B. GRANT.